United States Patent
Chan et al.

(10) Patent No.: US 10,649,619 B2
(45) Date of Patent: May 12, 2020

(54) SYSTEM AND METHOD OF USING CONTEXT IN SELECTING A RESPONSE TO USER DEVICE INTERACTION

(71) Applicant: Oath Inc., New York, NY (US)

(72) Inventors: Christopher Chan, Santa Clara, CA (US); Maud Calegari, Mountain View, CA (US); Stephen Murphy, Sunnyvale, CA (US); Lu Ding, Fremont, CA (US); Maurice Rotta, San Bruno, CA (US); Peter Levinson, San Carlos, CA (US)

(73) Assignee: OATH INC., New York, NY (US)

(*) Notice: Subject to any disclaimer, the term of this patent is extended or adjusted under 35 U.S.C. 154(b) by 470 days.

(21) Appl. No.: 13/772,714

(22) Filed: Feb. 21, 2013

(65) Prior Publication Data
US 2014/0237425 A1    Aug. 21, 2014

(51) Int. Cl.
G06F 3/048    (2013.01)
G06F 3/0482   (2013.01)

(52) U.S. Cl.
CPC ................. G06F 3/0482 (2013.01)

(58) Field of Classification Search
CPC .......................... G06F 3/0481–0489
USPC ....... 715/810, 808, 811, 825, 826, 708, 711, 715/715
See application file for complete search history.

(56) References Cited

U.S. PATENT DOCUMENTS

| | | | | |
|---|---|---|---|---|
| 5,204,947 A | * | 4/1993 | Bernstein et al. | 715/854 |
| 5,805,167 A | * | 9/1998 | van Cruyningen | 715/808 |
| 5,859,636 A | * | 1/1999 | Pandit | G06F 17/2765 715/204 |
| 6,181,344 B1 | * | 1/2001 | Tarpenning et al. | 715/863 |
| 6,233,448 B1 | * | 5/2001 | Alperovich | H04M 3/42229 455/414.1 |
| 6,338,059 B1 | * | 1/2002 | Fields | G06F 17/30864 707/706 |

(Continued)

OTHER PUBLICATIONS http://www.kikin.com; kikin Touch-Based Contextual Search; visited Feb. 20, 2013; 3 pages.

(Continued)

*Primary Examiner* — Steven B Theriault
(74) *Attorney, Agent, or Firm* — James J. DeCarlo; Greenberg Traurig, LLP

(57) ABSTRACT

A system, method and architecture of using context in determining a response to user interaction with a device, such context may be context of content being output by the device, the device's context, the user's content, or some combination of contexts. In accordance with one or more embodiments, a response may comprise a menu the content of which, e.g., one or more user-selectable actions or options, can be determined based on a determined context, or contexts, or a determination may be made to provide a response other than an option menu, which determination may be made based on a determined context or combination of contexts. As yet another alternative, a determination may be made to provide a response that includes a menu, the content of which is determined based on one or more determined contexts, and another response, such as an answer identified based on one or more determined contexts.

39 Claims, 15 Drawing Sheets

(56) References Cited

U.S. PATENT DOCUMENTS

| | | | |
|---|---|---|---|
| 6,341,306 B1* | 1/2002 | Rosenschein | G06F 17/30637 705/14.51 |
| 6,563,430 B1* | 5/2003 | Kemink | H04N 21/42202 340/12.22 |
| 6,701,144 B2* | 3/2004 | Kirbas | H04M 1/72572 455/414.1 |
| 6,785,670 B1* | 8/2004 | Chiang | G06F 17/30637 707/706 |
| 6,813,618 B1* | 11/2004 | Loui et al. | |
| 6,848,077 B1* | 1/2005 | McBrearty | G06F 17/30899 707/999.003 |
| 6,912,386 B1* | 6/2005 | Himberg | H04M 1/72569 455/418 |
| 6,975,874 B1* | 12/2005 | Bates | H04M 1/72572 455/414.1 |
| 6,981,242 B2* | 12/2005 | Lehmeier | G06F 9/4446 707/999.202 |
| 7,100,123 B1* | 8/2006 | Todd et al. | 715/862 |
| 7,113,168 B2* | 9/2006 | Oya | G06F 3/0362 345/157 |
| 7,213,048 B1* | 5/2007 | Parupudi | G06F 17/30241 455/456.1 |
| 7,231,229 B1* | 6/2007 | Hawkins | H04M 1/274558 345/1.1 |
| 7,457,628 B2* | 11/2008 | Blumberg | G01C 21/20 455/414.1 |
| 7,464,153 B1* | 12/2008 | Abbott | G06F 1/163 709/203 |
| 7,512,874 B2* | 3/2009 | Yano | G06F 17/30011 707/999.003 |
| 7,581,188 B2* | 8/2009 | Hiles | G06F 3/0481 715/744 |
| 7,603,349 B1* | 10/2009 | Kraft et al. | |
| 7,634,718 B2* | 12/2009 | Nakajima | G06F 3/04883 715/200 |
| 7,697,943 B2* | 4/2010 | Jung | H04M 1/72572 455/404.2 |
| 7,711,550 B1* | 5/2010 | Feinberg | G06F 17/278 704/1 |
| 7,712,024 B2* | 5/2010 | Reynar | G06F 17/2785 707/739 |
| 7,743,048 B2* | 6/2010 | Baldwin | G06F 17/3087 707/713 |
| 7,890,888 B2* | 2/2011 | Glasgow | G06F 3/0482 715/780 |
| 7,983,401 B1* | 7/2011 | Krinsky | H04M 3/527 379/88.23 |
| 7,992,085 B2* | 8/2011 | Wang-Aryattanwanich | G06F 9/451 715/711 |
| 8,050,690 B2* | 11/2011 | Neeraj | G06Q 10/10 455/456.1 |
| 8,086,265 B2* | 12/2011 | White | H04M 1/22 340/856.3 |
| 8,108,794 B2* | 1/2012 | Sattler | G06F 17/277 715/712 |
| 8,117,542 B2* | 2/2012 | Radtke | G06F 9/4443 715/708 |
| 8,146,110 B2* | 3/2012 | Lyndersay | G06F 9/54 715/748 |
| 8,176,431 B1* | 5/2012 | Scannell | G06F 9/4443 715/762 |
| 8,280,831 B1* | 10/2012 | Rubin | G06N 5/04 706/12 |
| 8,341,529 B1* | 12/2012 | Li | G06F 16/95 715/741 |
| 8,407,577 B1* | 3/2013 | Franklin | G06Q 30/0641 715/208 |
| 8,429,103 B1* | 4/2013 | Aradhye | G06N 99/005 706/12 |
| 8,437,779 B2* | 5/2013 | Phukan | G06F 17/3087 455/404.2 |
| 8,473,988 B2* | 6/2013 | Ohta | G06F 3/017 715/700 |
| 8,477,109 B1* | 7/2013 | Freed | G06F 3/041 345/173 |
| 8,630,662 B2* | 1/2014 | Herz | H04M 3/42348 455/456.1 |
| 8,631,009 B2* | 1/2014 | Lisa | G06F 17/30651 707/736 |
| 8,671,365 B2* | 3/2014 | Berus | G01C 21/3632 715/856 |
| 8,799,255 B2* | 8/2014 | Ramachandran | G06F 17/30967 345/163 |
| 8,881,057 B2* | 11/2014 | Mori | H04M 1/72569 715/810 |
| 8,942,995 B1* | 1/2015 | Kerr | H04W 4/021 463/25 |
| 8,990,384 B2* | 3/2015 | Tallgren | H04W 24/00 709/224 |
| 9,008,693 B2* | 4/2015 | Boldyrev | H04W 4/043 455/456.3 |
| 9,092,400 B1* | 7/2015 | Lin | G06F 17/218 |
| 9,100,779 B2* | 8/2015 | LaMarca | G06F 17/30 |
| 9,146,665 B2* | 9/2015 | Gandhi | G06F 3/0488 |
| 9,183,306 B2* | 11/2015 | Robarts | G06F 17/30867 |
| 9,189,252 B2* | 11/2015 | Chu | G06F 9/451 |
| 9,356,894 B2* | 5/2016 | Appelman | G06Q 10/107 |
| 9,396,281 B2* | 7/2016 | Kim | G06F 17/30905 |
| 9,652,109 B2* | 5/2017 | Borzello | G06F 3/0482 |
| 9,703,596 B2* | 7/2017 | Lyndersay | G06F 9/54 |
| 9,779,168 B2* | 10/2017 | Lieb | G06F 17/30867 |
| 9,811,320 B2* | 11/2017 | McCoy | G06F 3/0482 |
| 9,858,925 B2* | 1/2018 | Gruber | G10L 15/18 |
| 9,921,718 B2* | 3/2018 | Kuster | G06F 3/0482 |
| 10,057,736 B2* | 8/2018 | Gruber | H04W 4/16 |
| 2002/0069223 A1 | 6/2002 | Goodisman et al. | 707/513 |
| 2002/0147004 A1* | 10/2002 | Ashmore | H04M 3/4938 455/414.2 |
| 2002/0188603 A1* | 12/2002 | Baird et al. | 707/3 |
| 2002/0194300 A1* | 12/2002 | Lin et al. | 709/217 |
| 2002/0199018 A1* | 12/2002 | Diedrich | H04L 29/06 709/245 |
| 2003/0050815 A1* | 3/2003 | Seigel | G06F 17/3087 705/26.41 |
| 2003/0135582 A1* | 7/2003 | Allen | G06F 17/30867 709/217 |
| 2003/0160830 A1* | 8/2003 | DeGross | G06F 17/2735 715/808 |
| 2004/0054744 A1* | 3/2004 | Karamchedu et al. | 709/206 |
| 2004/0259536 A1* | 12/2004 | Keskar | H04M 1/72569 455/418 |
| 2005/0003804 A1* | 1/2005 | Huomo et al. | 455/414.1 |
| 2005/0039141 A1* | 2/2005 | Burke et al. | 715/810 |
| 2005/0197826 A1* | 9/2005 | Neeman | 704/2 |
| 2005/0204309 A1* | 9/2005 | Szeto | 715/811 |
| 2005/0255861 A1* | 11/2005 | Wilson | H04W 4/02 455/456.2 |
| 2006/0005156 A1* | 1/2006 | Korpipaa | G06F 1/1613 717/100 |
| 2006/0023945 A1* | 2/2006 | King et al. | 382/173 |
| 2006/0148528 A1* | 7/2006 | Jung et al. | 455/566 |
| 2006/0168541 A1* | 7/2006 | Hill et al. | 715/810 |
| 2006/0184579 A1* | 8/2006 | Mills et al. | 707/104.1 |
| 2006/0190171 A1* | 8/2006 | Cross | G01C 21/36 701/469 |
| 2006/0238382 A1* | 10/2006 | Kimchi | G01C 21/26 340/995.1 |
| 2006/0248553 A1* | 11/2006 | Mikkelson | H04H 20/40 725/23 |
| 2006/0294094 A1* | 12/2006 | King | H04N 1/00244 |
| 2007/0005449 A1* | 1/2007 | Mathew | G06Q 30/06 705/26.1 |
| 2007/0106956 A1* | 5/2007 | Platt | G06F 17/30905 715/808 |
| 2007/0118661 A1* | 5/2007 | Vishwanathan | G06Q 30/02 709/227 |
| 2007/0198505 A1* | 8/2007 | Fuller | G06F 16/9537 |

(56) References Cited

U.S. PATENT DOCUMENTS

| | | | |
|---|---|---|---|
| 2007/0233692 A1* | 10/2007 | Lisa | G06F 17/30651 |
| 2007/0261030 A1* | 11/2007 | Wadhwa | G06F 11/3476 717/127 |
| 2008/0005071 A1* | 1/2008 | Flake | G06F 17/3087 |
| 2008/0005679 A1* | 1/2008 | Rimas-Ribikauskas | G01C 21/3688 715/745 |
| 2008/0125103 A1* | 5/2008 | Mock | G06F 17/3087 455/418 |
| 2008/0125173 A1* | 5/2008 | Chen | G06F 3/0482 455/557 |
| 2008/0146245 A1* | 6/2008 | Appaji | H04M 1/72572 455/456.1 |
| 2008/0163088 A1* | 7/2008 | Pradhan et al. | 715/764 |
| 2008/0229218 A1* | 9/2008 | Maeng | G06F 3/048 715/760 |
| 2008/0243788 A1* | 10/2008 | Reztlaff | G06F 17/30657 |
| 2008/0244460 A1* | 10/2008 | Louch | G06F 9/453 715/711 |
| 2008/0313172 A1* | 12/2008 | King | G06F 17/241 |
| 2009/0005981 A1* | 1/2009 | Forstall | G01C 21/20 701/431 |
| 2009/0100342 A1* | 4/2009 | Jakobson | G06F 17/30241 715/733 |
| 2009/0102859 A1* | 4/2009 | Athsani | G06F 3/011 345/619 |
| 2009/0228804 A1* | 9/2009 | Kim | G06F 17/30861 715/745 |
| 2009/0313244 A1* | 12/2009 | Sokolenko | G06F 17/30864 |
| 2010/0031176 A1* | 2/2010 | Song | G06F 3/0482 715/767 |
| 2010/0031198 A1* | 2/2010 | Zimmerman | G06F 3/0482 715/853 |
| 2010/0070484 A1* | 3/2010 | Kraft | G06F 17/30867 707/706 |
| 2010/0122194 A1* | 5/2010 | Rogers | G06F 3/04817 715/769 |
| 2010/0138416 A1* | 6/2010 | Bellotti | G06F 17/30056 707/736 |
| 2010/0146383 A1* | 6/2010 | Kim | G06F 17/2247 715/238 |
| 2010/0175116 A1* | 7/2010 | Gum | G06F 21/31 726/6 |
| 2010/0192098 A1* | 7/2010 | Kim | G06F 3/048 715/827 |
| 2010/0241663 A1* | 9/2010 | Huang | G06Q 30/02 707/770 |
| 2010/0279667 A1* | 11/2010 | Wehrs et al. | 455/414.1 |
| 2011/0015996 A1* | 1/2011 | Kassoway | G06F 17/30882 705/14.49 |
| 2011/0028138 A1* | 2/2011 | Davies-Moore | G06F 3/04817 455/418 |
| 2011/0047557 A1* | 2/2011 | Koskimies | G06F 9/4843 719/315 |
| 2011/0072338 A1* | 3/2011 | Caldwell | G05B 19/41845 715/205 |
| 2011/0072395 A1* | 3/2011 | King | G06F 17/241 715/825 |
| 2011/0072492 A1* | 3/2011 | Mohler | G06F 3/04817 726/3 |
| 2011/0078243 A1* | 3/2011 | Carpenter et al. | 709/204 |
| 2011/0119628 A1* | 5/2011 | Carter et al. | 715/812 |
| 2011/0167350 A1* | 7/2011 | Hoellwarth | G06F 3/0483 715/727 |
| 2011/0250875 A1* | 10/2011 | Huang | H04W 4/02 455/418 |
| 2011/0265010 A1* | 10/2011 | Ferguson et al. | 715/742 |
| 2011/0265035 A1* | 10/2011 | Lepage | G06F 3/0482 715/810 |
| 2011/0282700 A1* | 11/2011 | Cockcroft | G06Q 30/06 705/5 |
| 2012/0016678 A1* | 1/2012 | Gruber | G10L 15/22 704/275 |
| 2012/0022872 A1* | 1/2012 | Gruber | G06F 17/279 704/270.1 |
| 2012/0046068 A1* | 2/2012 | Katpelly | G06Q 30/0204 455/550.1 |
| 2012/0059780 A1* | 3/2012 | Kononen | H04M 1/72522 706/14 |
| 2012/0117499 A1* | 5/2012 | Mori et al. | 715/765 |
| 2012/0127082 A1* | 5/2012 | Kushler | G06F 3/04883 345/169 |
| 2012/0133650 A1* | 5/2012 | Lee | G06F 3/0488 345/419 |
| 2012/0151310 A1* | 6/2012 | El-kalliny | G06F 17/30867 715/205 |
| 2012/0265528 A1* | 10/2012 | Gruber | G10L 15/18 704/235 |
| 2012/0272144 A1* | 10/2012 | Radakovitz | G06F 3/04883 715/702 |
| 2012/0324395 A1* | 12/2012 | Cohen | G06F 17/30634 715/780 |
| 2013/0014040 A1* | 1/2013 | Jagannathan | G06Q 50/01 715/765 |
| 2013/0019172 A1* | 1/2013 | Kotler | G06F 3/0482 715/711 |
| 2013/0019182 A1* | 1/2013 | Gil | G06F 3/0482 715/738 |
| 2013/0047115 A1* | 2/2013 | Migos | G06F 17/241 715/776 |
| 2013/0061148 A1* | 3/2013 | Das | G06K 9/3258 715/738 |
| 2013/0085848 A1* | 4/2013 | Dyor | G06Q 30/02 705/14.49 |
| 2013/0086056 A1* | 4/2013 | Dyor | G06F 3/167 707/730 |
| 2013/0091467 A1* | 4/2013 | Pallakoff | G06F 3/0482 715/835 |
| 2013/0117130 A1* | 5/2013 | Dyor et al. | 705/14.71 |
| 2013/0132566 A1* | 5/2013 | Olsen | H04W 4/025 709/224 |
| 2013/0132899 A1* | 5/2013 | Scott | G06F 3/03549 715/810 |
| 2013/0151963 A1* | 6/2013 | Costenaro | G06F 3/0481 715/711 |
| 2013/0311411 A1* | 11/2013 | Senanayake | G06F 3/013 706/13 |
| 2013/0311870 A1* | 11/2013 | Worsley | G06F 17/30952 715/234 |
| 2014/0052681 A1* | 2/2014 | Nitz | H04L 51/02 706/46 |
| 2014/0111542 A1* | 4/2014 | Wan | G06F 17/30253 345/633 |
| 2015/0161149 A1* | 6/2015 | Genera | G06F 17/3087 707/711 |
| 2017/0052659 A1* | 2/2017 | Ivanov | G06F 17/30867 |

OTHER PUBLICATIONS http://www.kikin.com/blog/2012/02/kikin-browser-fast-easy-streamlined; kikin Easy-Search API: Fast, Easy, Streamlined; posted Feb. 13, 2012; Feb. 20, 2013; 2 pages.

http://www.kikin.com/blog/2012/09/kikin-contextual-search-demo; kikin contextual search demo: Web; Posted on Sep. 28, 2012; visited on Feb. 20, 2013; 1 page.

http://www.kikin.com/blog/2012/02/sneak-preview-of-kikin-for-the-iphone-and-ipod-touch Sneak Preview of kikin for the iPhone and iPod Touch!; Posted on Feb. 29, 2012; visited on Feb. 20, 2013; 1 page.

http://www.bing.com/community/site_blogs/b/search/archive/2011/07/05/bing-for-ipad-update-searching-without-a-search-box.aspx Bing for iPad Update: Searching Without a Search Box; Posted on Jul. 5, 2011; visited on Feb. 21, 2013; 1 page.

* cited by examiner

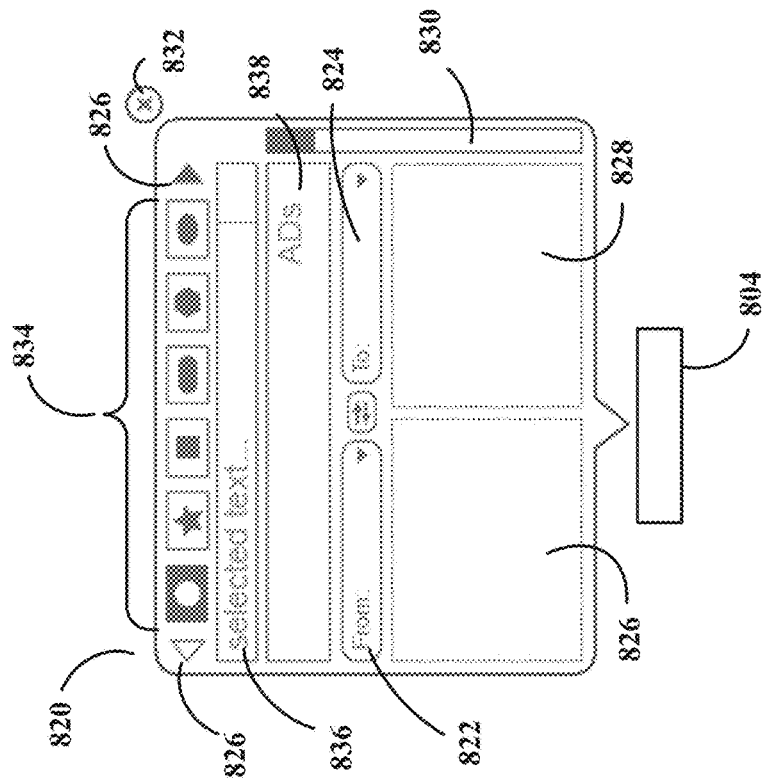
FIGURE 8C
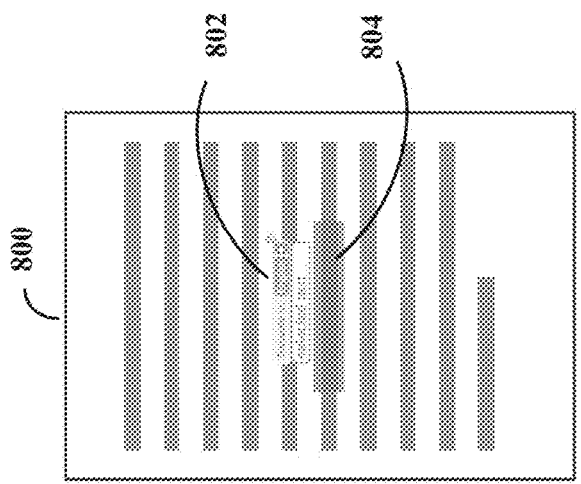
FIGURE 8A
FIGURE 8B

SYSTEM AND METHOD OF USING CONTEXT IN SELECTING A RESPONSE TO USER DEVICE INTERACTION

FIELD OF THE DISCLOSURE

The present disclosure relates responding to a user's interactions based on at least one determined context, which determined context may include context(s) such as and without limitation context of content, device and/or user, and more particularly to functionality to provide a response to a user's interaction with a device based on the at least one context.

BACKGROUND

Computing devices, such as desktop computers, laptop computers, tablets, smartphones, etc., are being used more and more to access various content, including without limitation web pages, multimedia, audio, video, etc. While users' time may be more limited, the amount of content available for consumption by users is growing exponentially. In fact, users are unaware of a great deal of content that is available for consumption.

SUMMARY

The present disclosure seeks to address failings in the art and to provide functionality to facilitate a user's content experience. Embodiments of the present disclosure determine whether or not to display a menu in response to user interaction with a device, and in a case that it a determination is made to display a menu in response to the user interaction, a determination may be made what options to make available via the menu. In accordance with one or more such embodiments, a determination whether or not to display a menu and/or a determination what options to make available via the menu may be based on contextual determinations, e.g., determination of a context of content that is being output by the device, context of the device and/or context of the user.

By way of a non-limiting example, embodiments of the present disclosure may be used on a device that is displaying web page content, such as that provided via a browser application, and the user may interact with the device to select a portion of content, e.g., text, image, video, etc., from the web page content. In response and in accordance with at least one embodiment of the present disclosure, a context of the content selected from the web page may be used in combination with context of the device, e.g., a location determined using the device's location services, etc., and optionally a context of the user interacting with the device, e.g., information or knowledge gathered about the user such as a language preference of the user, location, one or more histories such as and without limitation browsing, searching, purchasing, etc., to determine whether or not to display a menu of options. The menu may comprise one or more options, or actions, that are selectable by the user to perform an action using the content selected from the web page. By way of a further non-limiting example, a determination may be made not to display a menu of options but to provide a response other than the menu comprising one or more options as a response to a user's selection of a English-language word from the web page where it is determined from the context of the content, e.g., the web page as a whole or the selected content, together with the user's context, which indicates that the user's primary language is French. The response that is provided rather than providing a menu from which the user might select a translation option is to display a definition of the English-language content and/or translation of the content from English to French, which translation may be in audio and/or visual form. By way of some non-limiting examples, a response might be generated using results retrieved from a dictionary search, results retrieved from a translation service, or services, etc.

As yet another non-limiting example, embodiments of the present disclosure may display a menu, e.g., a contextual menu, which is displayed in response to a user's selection of a portion of a web page. or other windowing display. The user might highlight a word, or words, being displayed at a device, and the menu appears in response with options to search photographs, images, news, web, Wikipedia, etc. A response to user selection of one of the options may be displayed in the web page, or other display component, that contains the highlighted word or words. In accordance with one or more embodiments, the menu is a contextual menu in that its contents are determined based on a determined context, or determined contexts, such as context of content, context of the device, context of the user, or a combination of determined contexts.

In accordance with one or more embodiments, a method is provided, the method comprising determining, via at least one processing unit, a context of content being output by a device; determining, via the at least one processing unit, at least one other context; detecting, via the at least one processing unit, user interaction with the device, the user interaction associated with selected content output by the device; using, via the at least one processing unit, the context of the content and the at least one other context to make a determination whether or not to respond to the user interaction with a menu comprising a plurality of user-selectable options, the plurality of user-selectable options comprising at least one search option selectable to perform a search using the selected content; and instructing, via the at least one processing unit, the device to output a response to the user interaction that is based on the determination.

In accordance with other embodiments of the present disclosure a system is provided, which system comprises at least one computing device comprising one or more processors to execute and memory to store instructions to determine a context of content being output by a device; determine at least one other context; detect user interaction with the device, the user interaction associated with selected content output by the device; use the context of the content and the at least one other context to make a determination whether or not to respond to the user interaction with a menu comprising a plurality of user-selectable options, the plurality of user-selectable options comprising at least one search option selectable to perform a search using the selected content; and instruct the device to output a response to the user interaction that is based on the determination.

In accordance yet one or more other embodiments, a computer readable non-transitory storage medium for tangibly storing thereon computer readable instructions that when executed cause at least one processor to determine at least one other context; detect user interaction with the device, the user interaction associated with selected content output by the device; use the context of the content and the at least one other context to make a determination whether or not to respond to the user interaction with a menu comprising a plurality of user-selectable options, the plurality of user-selectable options comprising at least one search option selectable to perform a search using the selected content; and instruct the device to output a response to the user interaction that is based on the determination.

In accordance with one or more embodiments, a system is provided that comprises one or more computing devices configured to provide functionality in accordance with such embodiments. In accordance with one or more embodiments, functionality's embodied in steps of a method performed by at least one computing device. In accordance with one or more embodiments, program code to implement functionality in accordance with one or more such embodiments is embodied in, by and/or on a computer-readable medium.

DRAWINGS

The above-mentioned features and objects of the present disclosure will become more apparent with reference to the following description taken in conjunction with the accompanying drawings wherein like reference numerals denote like elements and in which:

FIG. 1, which comprises FIGS. 1A and 1B, provides an example process flow in accordance with one or more embodiments of the present disclosure.

FIG. 2, which comprises FIGS. 2A-2F, provides user interface examples in accordance with one or more embodiments of the present disclosure.

FIG. 3 provides an example of the popup window in accordance with one or more embodiments of the present disclosure.

FIG. 4, which comprises FIGS. 4A and 4B, provides another example of a popup sidebar in accordance with one or more embodiments of the present disclosure.

FIG. 5, which comprises FIGS. 5A and 5B, provide another user interface example in accordance with one or more embodiments of the present disclosure.

FIG. 6, which comprises FIGS. 6A and 6B, provides an example of a preview interface in accordance with one or more embodiments of the present disclosure.

FIG. 7, which comprises FIGS. 7A and 7B, provides another example of an interface to provide previews of multiple responses in accordance with one or more embodiments of the present disclosure.

FIG. 8, which comprises FIGS. 8A-8C, provides a language translation example in accordance with one or more embodiments of the present disclosure.

FIGS. 9, 10 and 11 provide examples of a set of icons displayed in a radial display in accordance with one or more embodiments.

DETAILED DESCRIPTION

Figure 1A:
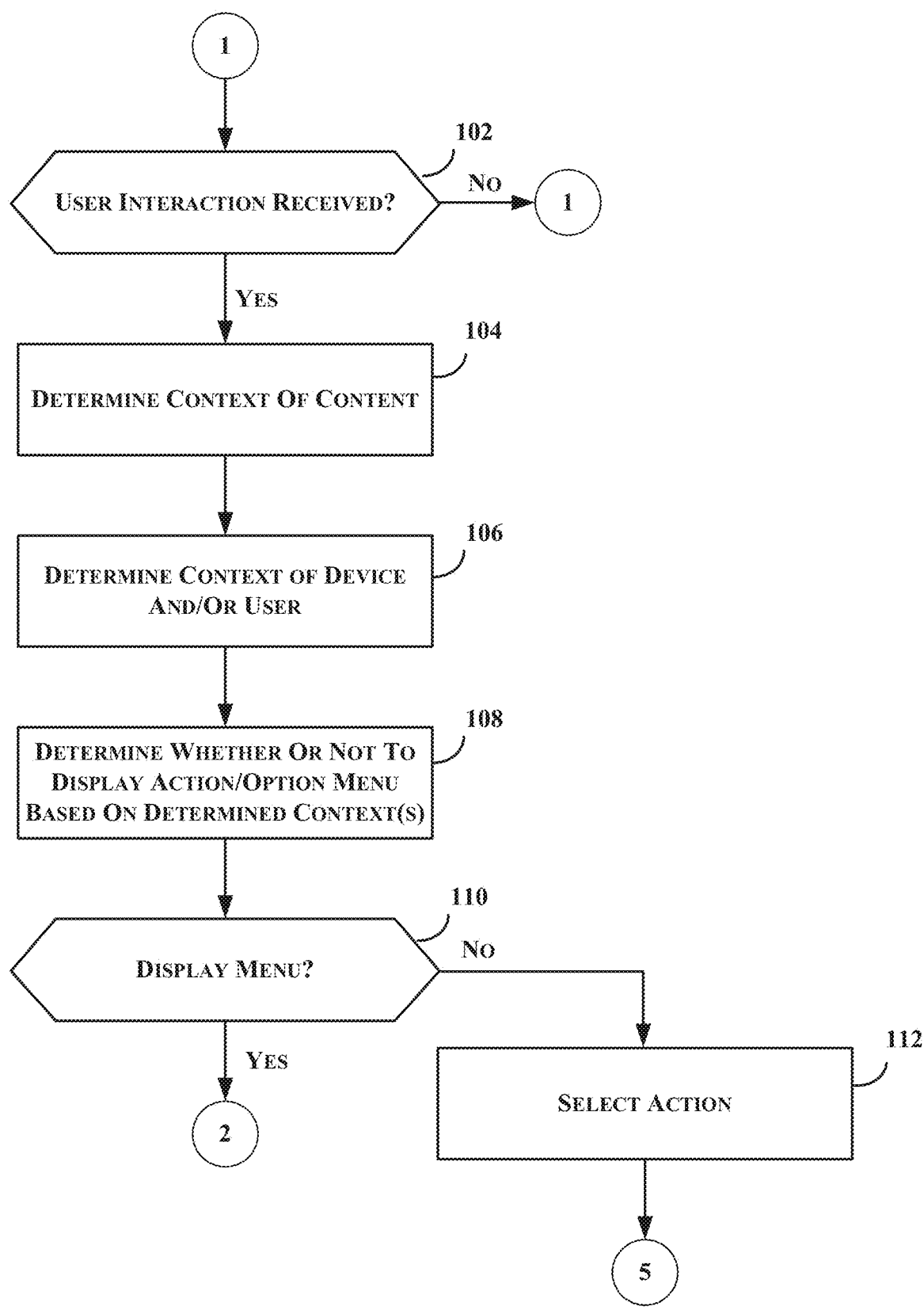

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The detailed description provided herein is not intended as an extensive or detailed discussion of known concepts, and as such, details that are known generally to those of ordinary skill in the relevant art may have been omitted or may be handled in summary fashion.

Certain embodiments of the present disclosure will now be discussed with reference to the aforementioned figures, wherein like reference numerals refer to like components.

In general, the present disclosure includes a system, method and architecture of using context in selecting a response to user interaction with a device, such context may be context of content being output by the device, the device's context, the user's content, or some combination of contexts. In accordance with one or more embodiments, a response may comprise a menu the content of which, e.g., one or more user-selectable actions or options, can be determined based on a determined context, or contexts, or a determination may be made to provide a response other than an option menu, which determination may be made based on a determined context or combination of contexts. As yet another alternative, a determination may be made to provide a response that includes a menu, the content of which is determined based on one or more determined contexts, and another response, such as an answer identified based on one or more determined contexts. In accordance with one or more such embodiments, a determination whether or not to display a menu and/or a determination of what options are made available in the menu may be based on contextual determinations, e.g., determination of a context of content that is being output by the device, context of the device and/or context of the user.

In a non-limiting example discussed above, a response may comprise instructing a device, e.g., a device from which user interaction is received and at which content is being output, e.g., played audibly and/or visually, to provide an audio and/or visual response, which is in response to a user's interaction with the device, and/or the response may comprise a menu of user-selectable options or other content. By way of some non-limiting examples, a response may comprise a pop-up menu and may be triggered by user input, such as without limitation the user selecting or highlighting text displayed at a device, by voice input that is received at the device, by a gesture detected via the device, by a hand wave or other motion detected via the device, etc., triggered by other input, such as without limitation pre-selected text from a web page or other content being displayed at the device.

Figure 1B:
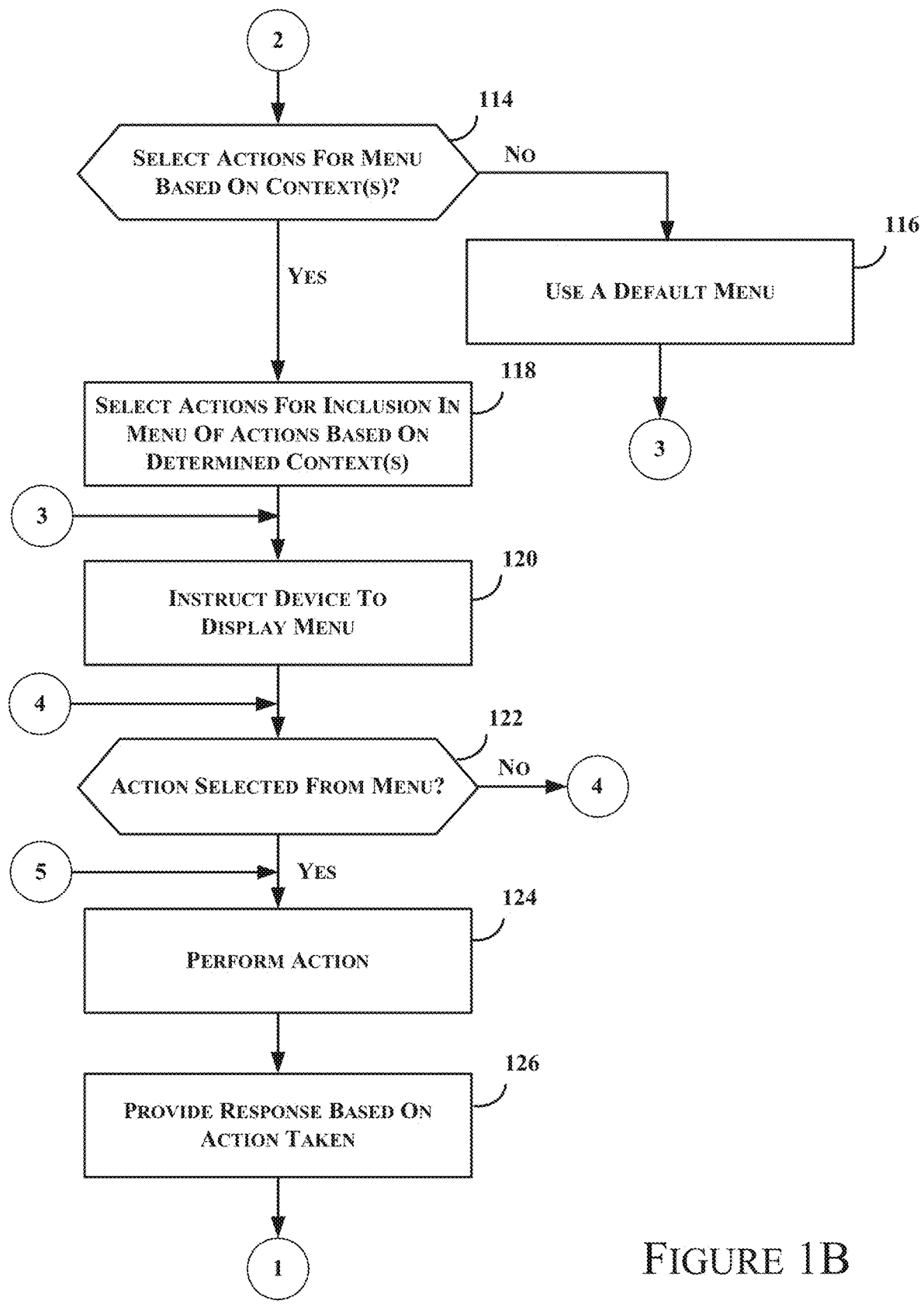

In accordance with one or more embodiments, the content of the menu, e.g., a pop-up menu, may comprises user-selectable options or actions, such as without limitation a search, e.g., web search, image search, video search, map search, etc. By way of some non-limiting examples, selection of an option included in the menu may trigger an overlay, a sidebar, a search and/or a display of search results, launch a new web page and/or application, etc. The menu may comprise sponsored content or advertisements, etc. By way of some non-limiting examples, the menu might display a definition of selected text, content returned from a search, sponsored content, advertisements, etc. By way of some non-limiting examples, the response may comprise audio content in addition to or in place of content that is displayed FIG. 1, which comprises FIGS. 1A and 1B, provides an example process flow in accordance with one or more embodiments of the present disclosure. The process flow may be implemented using one or more processing units, computing devices comprising one or more processors, etc. As discussed herein, a computing device may comprise one or more user computing devices, one or more server computers, a combination of computing devices.

With reference to FIG. 1A, a determination is made whether or not user interaction is received via a device, such as a user computing device that is outputting content. A computing device may be any type of computing device, including without limitation a smartphone, tablet, laptop computer, desktop computer, set top box, server computer, etc. If no interaction is detected, processing continues at step 102.

In accordance with one or more embodiments, the computing device may include a number of mechanisms for receiving user input, including without limitation, keyboard, mouse or other pointer device, touch screen, microphone, camera, etc. If it is determined, at step 102, that user interaction is received, processing continues at step 104 to determine context of content, which content may comprise content that is being output by the device before, during and/or after the user interaction is detected, for example. By way of some further non-limiting examples, the content may be audio, video, multimedia, still image such as a photograph, streaming content, etc.

A context analysis may be used to identify a context of the content, e.g., content selected from a web page. The context analysis may be used to identify a meaning or context of the content. By way of a further non-limiting example, the content for which a context is determiner may be selected content, such as content selected by the user via the user interaction and/or preselected content, which context may be used to determine whether or not a response to the user interaction includes a menu, and where a menu is used in response, the context of the content may be used to determine the content of the menu, such as and without limitation one or more user-selectable options or action, advertisement and/or other content. The content analysis may analyze content of any type, including without limitation audio, video, multimedia, etc. content. In addition to the content, the content analysis may use additional information, such as metadata, associated with the content in determining a context of the content.

At step 106, other contexts may be determined, such as and without limitation a context of the device and/or, a content of the user. By way of some non-limiting examples, the context of the device may comprise information about the device, such as a type, model, hardware and software resources, network connectivity, location, weather, etc. The content of the device may comprise any information that may be obtained via the device. A device type may include information to identify the device as a smartphone, tablet, etc., for example. Network connectivity may include information to identify a current network connectivity, such as and without limitation whether the device is communicating via a cellular network, a wireless network, a wired network, etc., or some combination of networks. The device context may further provide information used in determining at least a portion of a user context, such as without limitation the device's location service(s) that provide information useful in determining the user's location. User context may include information about the user, which information may be explicitly supplied by the user, such as preferences, demographic information, such as age, gender, home and/or work address(es), social and other contacts, calendar, education, hobbies, preferred language, etc., or gathered from on the user's interactions, e.g., user's web browsing history, content playback, purchasing history, software application usage, interaction with menu options/actions previously provided to the user, etc. The device context and/or user context may be used in combination with the context of content to determine whether or not to respond to the user interaction with a menu of options and, if so, what options to include in the menu.

At step 108, a determination is made whether or not to display the menu of actions/options based on one or more determined contexts. In accordance with one or more embodiments, a determination may be made by determining based on the one or more determined contexts, a response to the user interaction. By way of a non-limiting example, a determination whether or not to display a menu of user-selectable options might be based on a likelihood that one of the options is the one being sought by the user. Where the likelihood that the option is the one being sought by the user, a response may be provided by performing the action associated with the option and providing the result of the action as a response rather than providing the user with a menu of options for the user to select an action(s) to be taken. The determination of whether or not to display the menu may be made by determining whether or not the likelihood satisfies a threshold probability, or likelihood, that a given option/action is the option/action being sought by the user.

At step 110, where it is determined not to display the menu, processing continues at step 112 to select an action, e.g., an action associated with the option identified at step 108, to perform in response to the user interaction, the action is performed at step 124, and a response may be provided, at step 126, based on the action taken at step 124. By way of a non-limiting example, the action might be performing a search using a portion of content selected by the user, or a portion of content selected for the user, e.g., content selected based on one or more of the determined contexts, and to provide a set of search results, which set of search results may be filtered based on one or more of the determined contexts. By way of a further non-limiting example, the search conducted, e.g., web search, encyclopedia search, dictionary search, image search, etc., and/or the results provided may be determined based on or more of the determined contexts.

At step 110, if it is determined to display a menu, processing continues at step 114, to make a determination whether or not to select actions/options and/or content for inclusion in the menu based on one or more determined contexts. If not, processing continues at step 116 to use a default menu, e.g., a menu personalized by the user and including at least one option selected by the user for inclusion in the menu. If at least some portion of the menu is to be determined based on a context, or contexts, processing continues at step 118 to determine the menu that is to be provided to the user. By way of a non-limiting example, the menu may include a menu option that when selected would provide a verbal pronunciation of a word may be included in the menu where the context of the content and the content of the user indicate that the selected content is in a foreign language, e.g., a language other than the user's native/preferred language. By way of another non-limiting example, the menu may include a menu option that when selected provides a search of news content where the context of the content indicates that it relates to a current event and/or the user's context indicates that the user is interested in news content. By way of yet another non-limiting example, a menu might include a menu option that when selected would search for nearby coffee shops where the context of the device includes information indicating that it is early morning, the context of the content is related to coffee and the context of the user indicates the user's preference for coffee.

At step 120, the device is instructed to display the menu, e.g., a default menu selected at step 116 or a menu determined at step 118. At step 122, a determination is made whether or not an action is selected by the user. If not, processing awaits an action. If an action is selected, processing continues at step 124 to perform the action and at step 126 to provide a response based on the action. Processing continues at step 102 to await further user interaction with the device.

In one exemplary embodiment discussed above in connection with the process flow of FIG. 1, a determination is made whether or not to display a menu of options, which determination may be made based on a likelihood that an identified response is a response sought by the user. If so, the identified response is output to the user rather than outputting a menu. Alternatively and in accordance with one or more embodiments, the identified response and a menu may both be output. The menu may be a context menu comprising one or more user-selectable actions/options for taking further action.

Embodiments of the present disclosure provide an ability for the user to personalize the menu. A menu may be personalized in various ways. By way of a non-limiting example, the size of icons that represent user-selectable actions may be increased or decreased. By way of a further non-limiting example, an icon representing a user-selectable option/action may be added to or removed from the menu, such as without limitation, search icon(s), multimedia icon(s), language icon(s), media/sharing icon(s), discovery icon(s), text-to-speech icon(s), dictionary icon(s), language translation icon(s) etc. By way of a further non-limiting example, a discovery icon may allow a user to explore a subject, such as a subject identified from selected text; in response to the user clicking on a discovery, or exploration, icon in the menu, the user is provided with a graph visualizing related entities, such as without limitation actors, recipes, movies, etc. By way of a further non-limiting example, a menu icon can be used for a vertical search to focus, or filter, a search on a segment of online content, such as without limitation Y! Finance®, Y! Sports®, Y! Answers®, YouTube®, Wikipedia®, etc. It should be apparent that embodiments of the present disclosure may select from these as well as other actions/options, e.g., where an action is selected at step 112 of FIG. 1. It should be apparent that other personalization is possible.

Figure 2A:
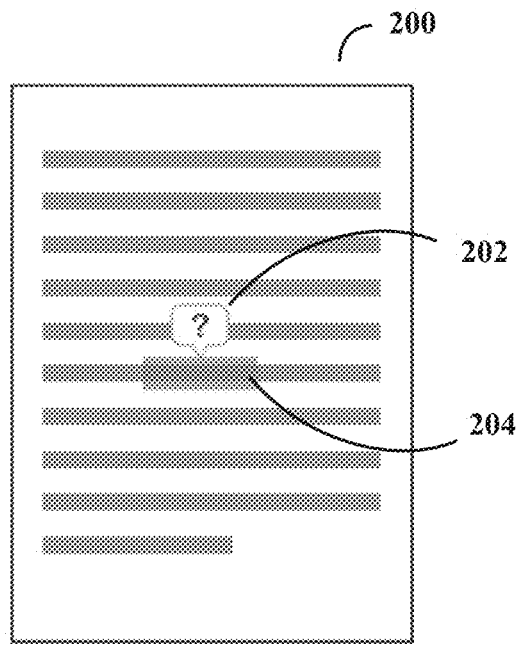

FIG. 2, which comprises FIGS. 2A-2F, provides user interface examples in accordance with one or more embodiments of the present disclosure, Referring to FIG. 2A, a display, e.g., web page, window, etc., 200 is provided, which includes content, e.g., text. In response to the user's selection 204, which in the example is a portion of displayed text, an icon 202, e.g., a tooltip, is displayed in proximity to the selection, e.g., in the example, the icon 202 is displayed above the selection. In accordance with one or more embodiments, where the user moves the cursor over the icon 202 or the content 204, a tip may be displayed to indicate to the user what action, e.g., a search, may be taken with the content selection 204 by selecting icon 202. The tip may be displayed for a time period and/or at least initially to alert the user what action(s) is/are possible, if the user clicks on the icon 202.

Figure 2B:
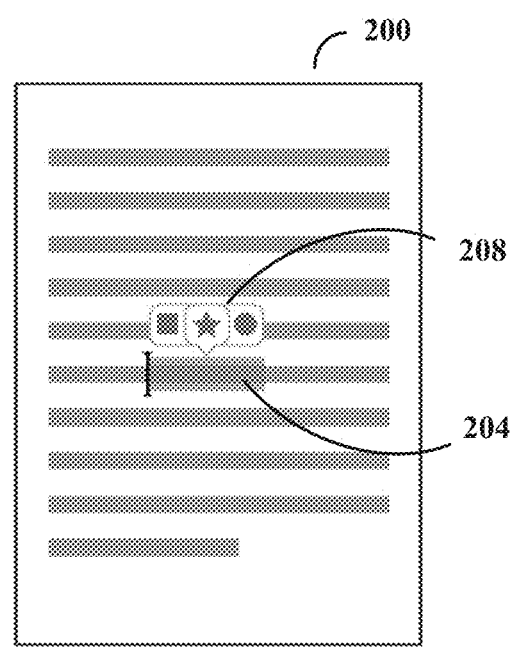

FIG. 2B provides another example in which a set of icons 208 may be displayed rather than a single icon 202. As with the icon 202, the icons in set 208 may be determined based on one or more contexts, and a tooltip may displayed for an icon as the cursor hovers over the icon or the selection 204, which tip may provide information about the action that corresponds with the icon. Where the user clicks on the icon 202 of FIG. 2A, or one of the icons in the set 208 of FIG. 2B, a popup window 206, such as that shown in FIG. 2C, may be displayed. In accordance with one or more embodiments, window 206 may be a modal window.

Figure 3:
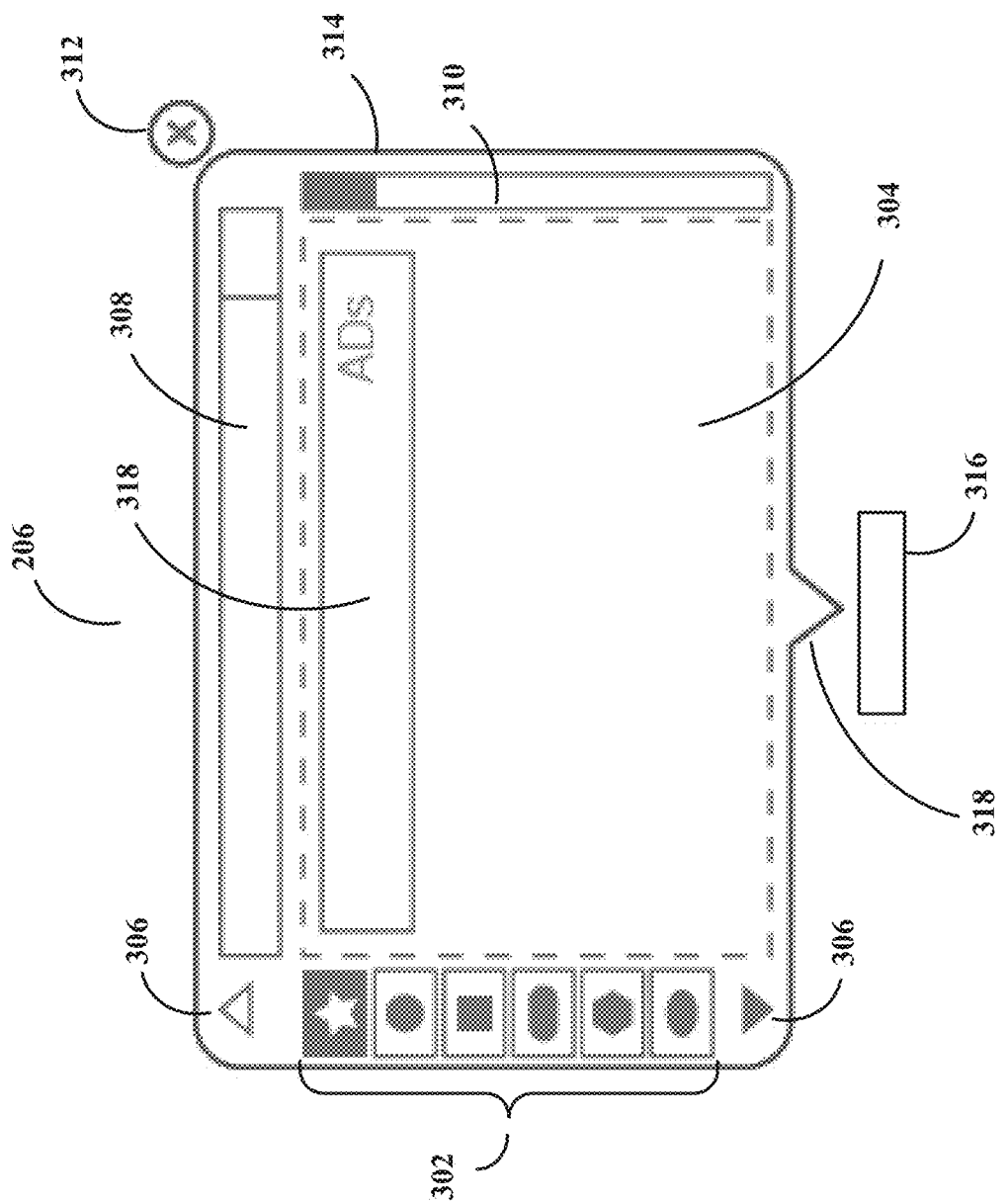

FIG. 3 provides an example of a popup window 206 displayed in response to user selection of an icon, such as icon 202 or an icon in set 208. In the example shown in FIG. 3, the window 206 may be displayed above selection 316, e.g., selection 204 of FIGS. 2A-2B. Container 314 of window 206 may include area 304. Search results may be displayed in area 304. Area 304 may further include a display area 318 for displaying other content, such as without limitation an advertisement, sponsored content, etc. The content displayed in display area 318 may be related to the content being displayed in area 304 and/or may be determined based on one or more contexts.

A set of action buttons, or icons, 302 may be displayed in window 206, which buttons may be included in the set based on to one or more contexts, such as without limitation context of content selected by the user and/or context of other content, such as content surrounding the user selected content, context of the device and/or context of the user. Scroll buttons 306 may be used to scroll through the set of buttons 302. The user may scroll through results displayed in area 304 using scroll bar 310, which scroll bar may include scroll buttons. Embodiments of the present disclosure maintain a focus of attention corresponding to the user's focus of attention, e.g., the user's content selection. An indicator, such as pointer 318 in FIG. 3 or, other indicator, may be used to associate the window 206 with the user's selection 316. In addition, search bar 308 may display the user's selection 316, and may be used by the user to modify the selection, change the text used for searching. Window 206 includes a close button 312.

Positioning of window 206 may vary depending on the location of the content selected by the user, such as and without limitation window 206 might be above, below, to the right or to the left of the selection.

As a user becomes more familiar with the tool provided in accordance with embodiments of the present disclosure, the user may wish to personalize or customize it according to their needs/desires. By way of some non-limiting examples, the user may wish to turn the tool off temporarily or permanently, choose a manner in which results are displayed, such as switching between window 206 of FIG. 3 and window 406 of FIG. 4, selecting action buttons for inclusion in set 302 or 402, positioning/repositioning action buttons, such as on top, side, or inline, relative to a search bar, selecting one or more default action buttons, such that when content is selected search results appear automatically in a window 206 or 406 based on the default action button(s) selected, specify behavior of sidebar 406 according to screen size and resolution, etc.

Figure 2C:
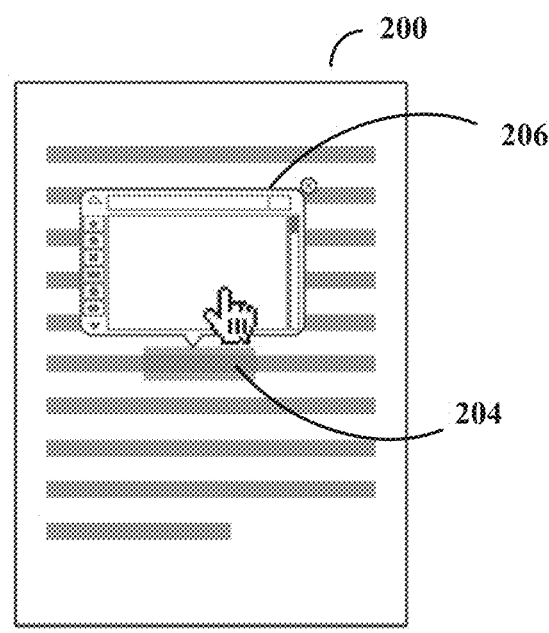
Figure 2D:
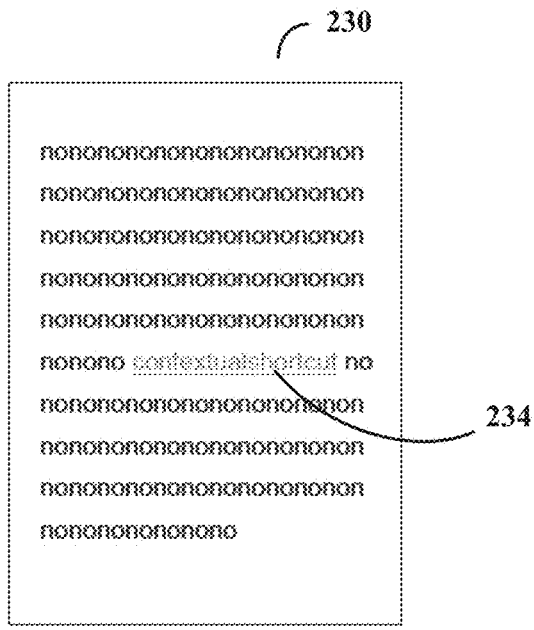
Figure 2E:
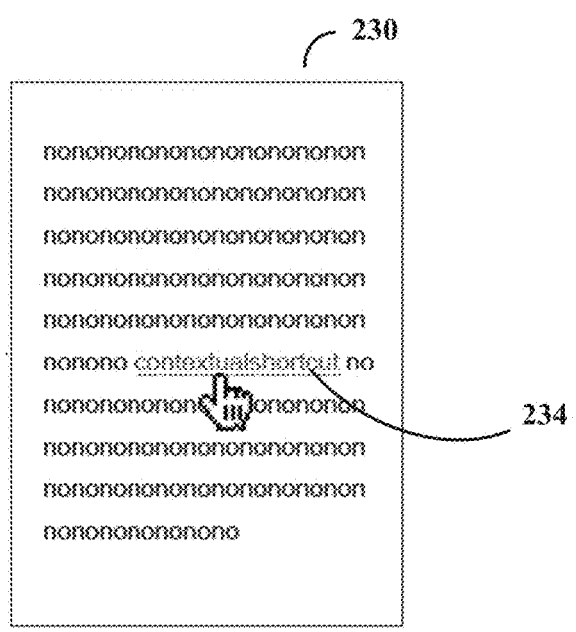
Figure 2F:
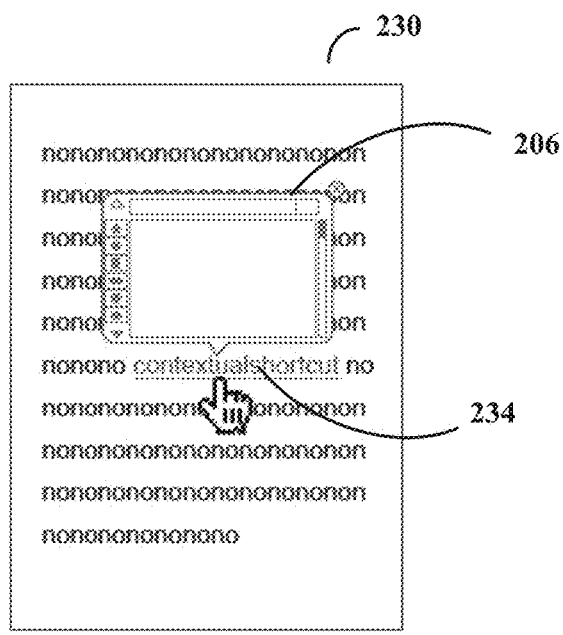

In the example of FIGS. 2A-2C, the content selection is made by the user. In the example of FIGS. 2D-2F, the content is preselected, such as without limitation based on one or more contexts, e.g., context of the content, user and/or device. Contextual shortcut 234 may be displayed as a hyperlink or in any manner that may be differentiated from other content, e.g., shaded, underlined, highlighted, etc. The differentiation may be such that it attracts attention of the user yet does not interfere with the user's experience of the content. Where the user locates the cursor over the selection 234, and while the cursor hovers over selection 234, it may change state, e.g., color, size, etc., to indicate additional functionality. While not shown, it should be apparent that icon 202 of FIG. 2A or icon set 208 of FIG. 2B may be displayed in response to the cursor hovering over the selection 234, such that the user may select an action to be taken with the preselected content. Window 206 of FIGS. 2F and 3 may be displayed in response to the user clicking on selection 234. Alternatively, window 206 may be displayed in response to user selection of an icon, e.g., icon 202 or an icon in set 208.

Figure 4A:
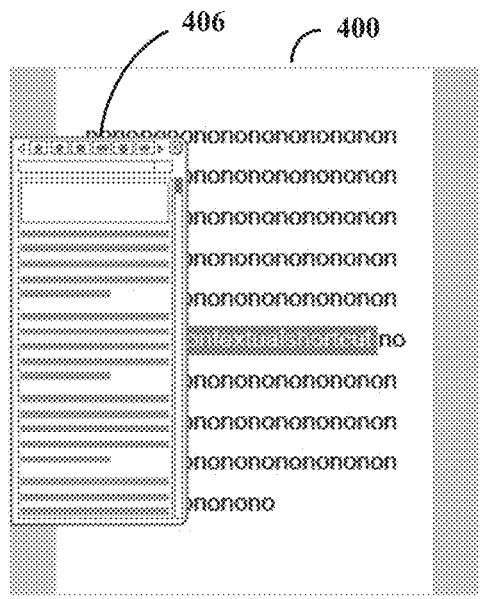
Figure 4B:
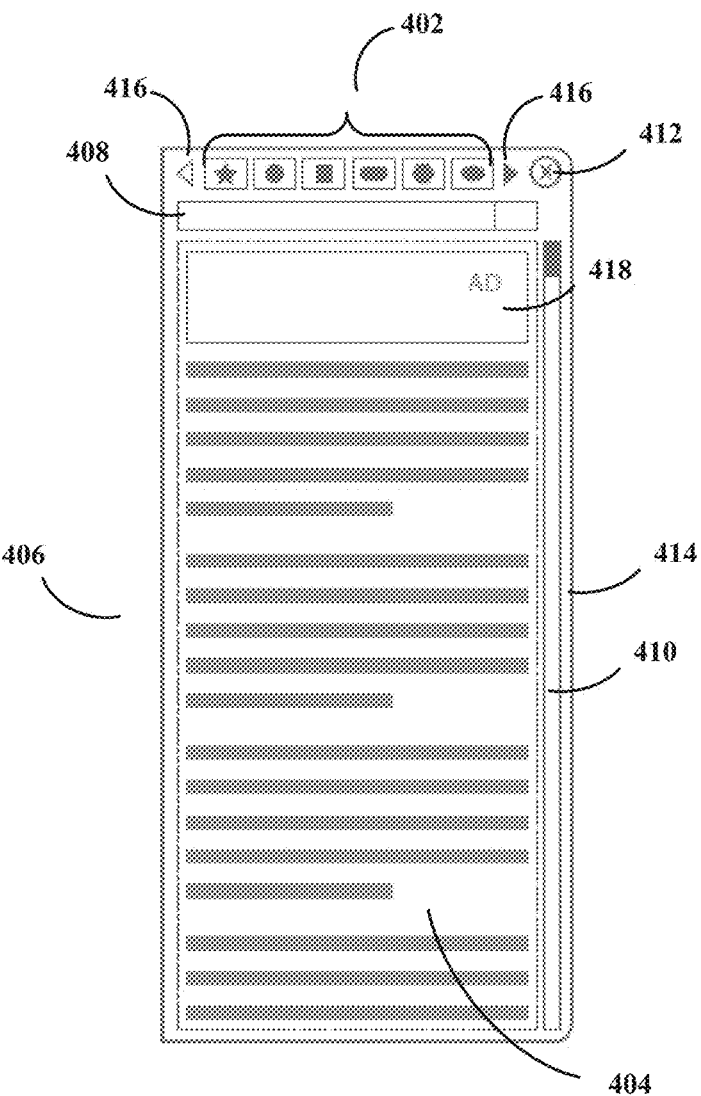

FIG. 4, which comprises FIGS. 4A and 4B, provides another example of a popup sidebar in accordance with one or more embodiments of the present disclosure. With reference to FIG. 4A, popup sidebar 406 may be displayed in response to a user action, e.g., selection of highlighted content, selection of an icon, etc. In the example of FIG. 4, the sidebar 406 is displayed along the left side of window 400; however, the sidebar may appear at any position relative to window 400, e.g., along any side of the window 400, superimposed over some portion of window 400, etc.

With reference to FIG. 4B, container 414 of sidebar 406 may include area 404, which may be used to display search results or other response. Area 404 may further include display area, which may display an advertisement, sponsored content or other content, which may or may not be related to the content being displayed in area 404. In accordance with one or more embodiments, the content that is displayed in area 418 may be selected based one or more contexts. A set of action buttons 402 may be displayed in sidebar 406; and buttons may be determined for inclusion in the set according to one or more contexts, such as without limitation context of content selected by the user and/or context of other content, such as content surrounding the user selected content in window 400, content displayed in area 418, etc. Scroll buttons 416 may be used to scroll through the set of buttons 402. The user may scroll through results displayed in area 404 using scroll bar 410, which scroll bar may include scroll buttons. Sidebar 406 may have a fixed height, and may include a visual hint at the bottom of area 404 indicating that more results follow.

Figure 5B:
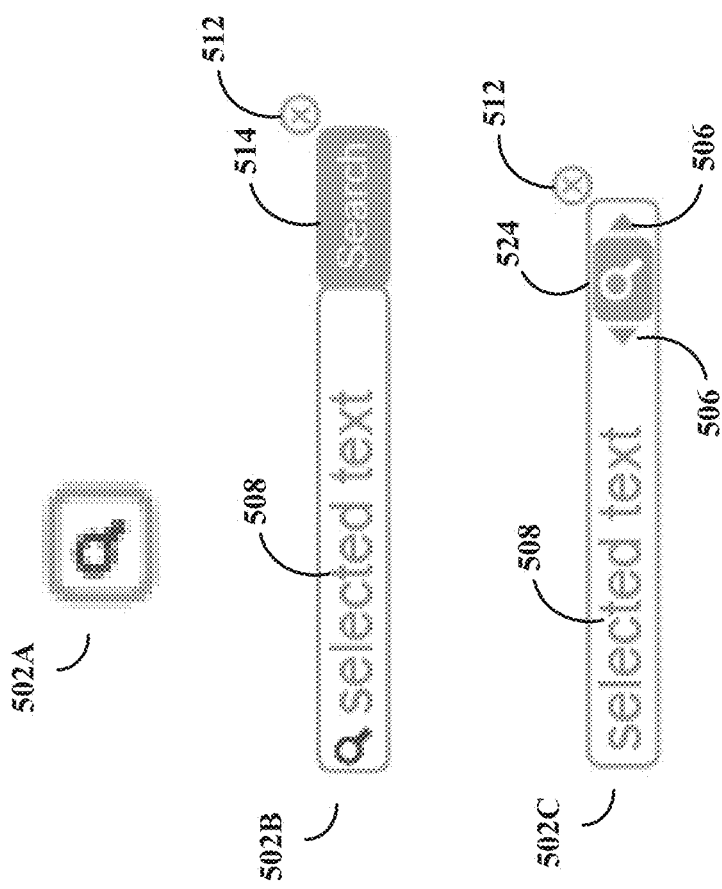
Figure 5A:
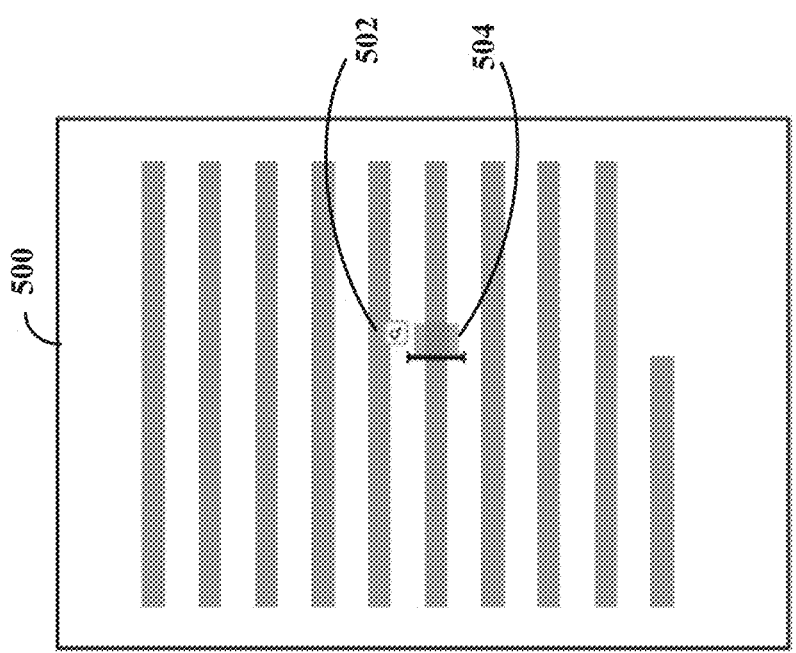

FIG. 5, which comprises FIGS. 5A and 5B, provide another user interface example in accordance with one or more embodiments of the present disclosure. In the example, an action selection interface 502 appears in window 500 as the user selects content 504 from window 500. FIG. 5B provides examples of interface 502. Interface 502A may comprise a search icon and be displayed initially in response to a user's selection of content. Icon 502A may be displayed above, below, to the left or to the right of the content selection, for example. Interface 502B and 502C each include a search field 508 and a close button 512. Search field 508 may display the content selected by the user. Search field 508 may be displayed in response to the user's content selection, and provides a visual cue indicating to the user that the user may perform a search based on the selected content. Where the search action button 514 is selected, a window, such as that shown in FIG. 3 or FIG. 4, may be displayed. In accordance with one or more embodiments, the search icon 514 may be replaced with a set of icons 524 and scroll buttons 506, which allow the user to scroll through available icons included in the set. Interface 502B, or interface 502C, may replace interface 502A based on the user's determined experience level with interface 502A, e.g., after the user has had an opportunity to use interface 502A for a threshold number of times. Search field 508 may be a fixed size, such that the content selection may be truncated where it is larger than the size of the field 508. Alternatively, search field 508 may expand to accommodate a greater portion of the content selection, where the selection is larger than an initial size of field 508.

Figure 6A:
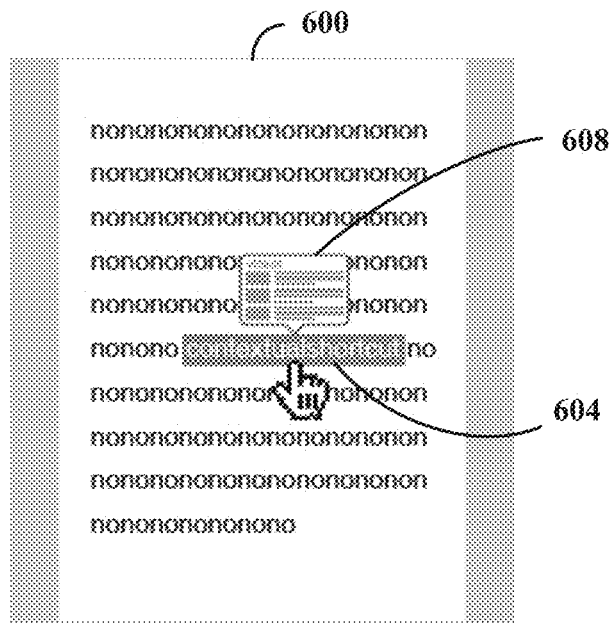
Figure 6B:
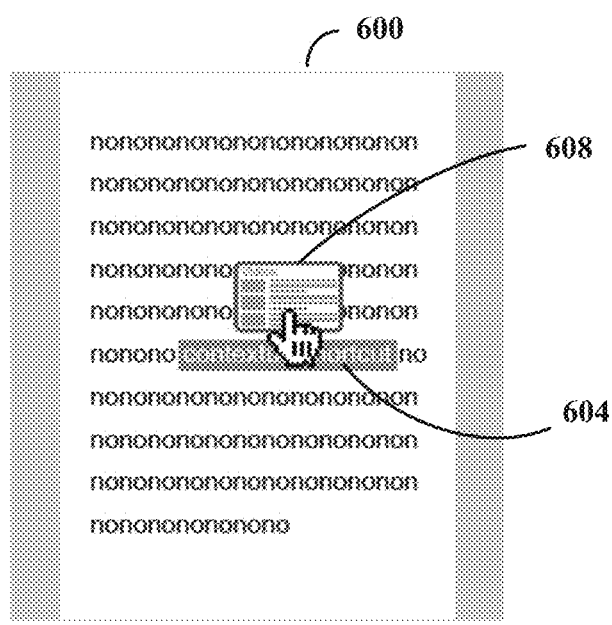

FIG. 6, which comprises FIGS. 6A and 6B, provides an example of a preview interface in accordance with one or more embodiments of the present disclosure. In the example shown in FIG. 6, a small popup window, or snapshot, 608 is displayed in response to a content selection 604, such as a user selection of preselected content from page 600. The preview interface might be used to display a snapshot of a response associated with a given action, e.g., a set of search results for a given vertical search. The window 608 may be used to cycle through a number of possible responses, each one associated with a given action, until the user selects one of the response. By way of a non-limiting example, the window 608 may initially display a snapshot of results of a search of one vertical search, and then may change to display a snapshot of another result, e.g., results of a different vertical search, and so on until the user selects one of the snapshots. Where the user selects one of the snapshots, a larger popup window, such as window 206 and 406, may be provided that displays the results corresponding to the snapshot selected by the user.

Figure 7A:
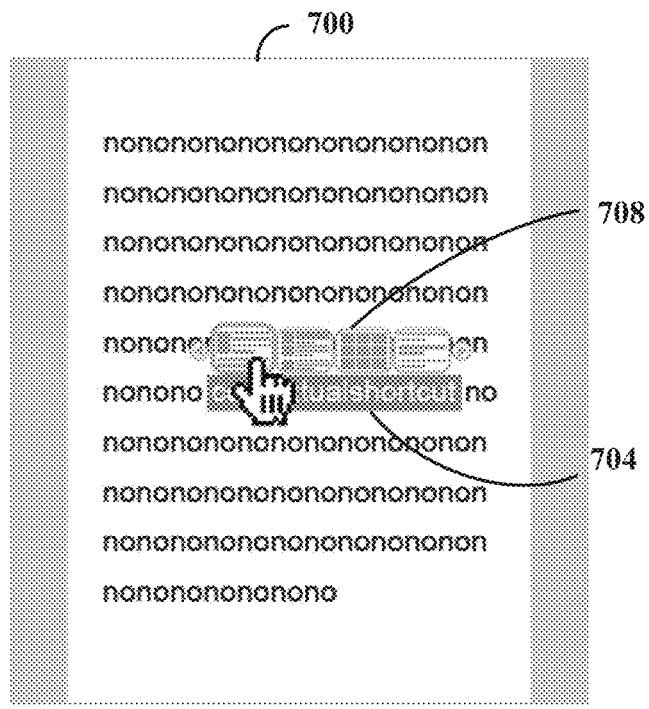
Figure 7B:
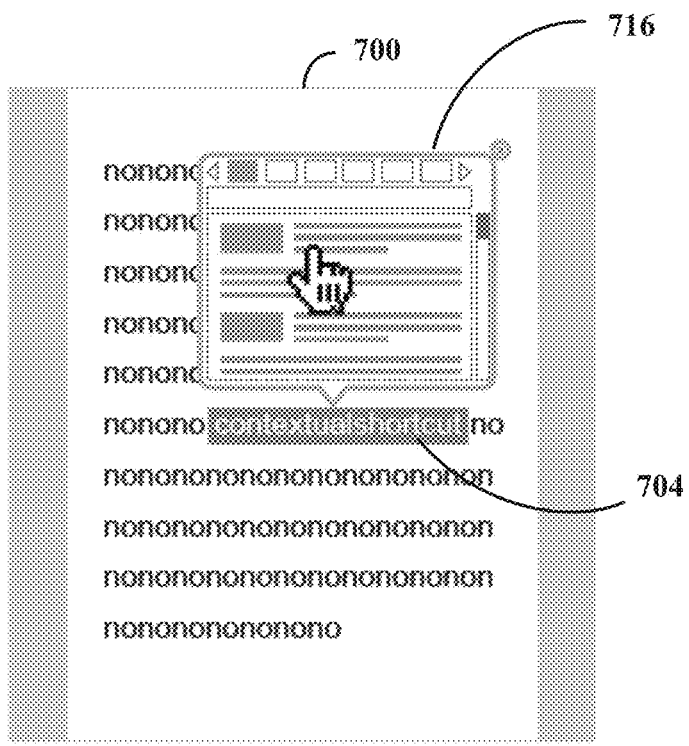

FIG. 7, which comprises FIGS. 7A and 7B, provides another example of an interface to provide previews of multiple responses in accordance with one or more embodiments of the present disclosure. In the example of FIG. 7, a set of small popup windows, or snapshots, 708 are displayed in response to a content selection, e.g., content selection 704, in window 700, each popup may provide a snapshot of a response that is selectable by the user. A scrolling capability may be provided to display addition snapshots. Where one of the snapshots is selected, a larger popup window 716, which might be window 206 and 406, may be provided that displays the search results corresponding to the snapshot selection by the user.

FIG. 8, which comprises FIGS. 8A-8C, provides a language translation example in accordance with one or more embodiments of the present disclosure. In the example shown in FIG. 8, the user selects a word, word sequence, etc. from page 800, Embodiments of the present invention determine that the selected content is in a foreign language, e.g., the language is different from the user's preferred language and/or the selected word(s) is/are in a language that differs from the language used for other words in page 800. In response to the user's selection 804, a search box 802 recommending translation is provided to the user. FIG. 8B provides some non-limiting examples of search box 802. In example 802A, at least a portion of selection 804 is displayed, together with an button, "Foreign", to identify the current language of the selection and a button, "English" to select a language to which the selection is to be translated and a button, e.g., "Translate" button, to initiate the translation.

In example 802B, the user is provided with an option to select the language into which the selection is to be translated, together with a button, e.g., "Go" button, to initiate the translation. In example 802C, the user is provided with an option to select the language into which the selection is to be translated, which selection initiates the translation. In examples 802A, 802B and 802C, a default language may be provided as the language into which the selection is to be translated. By way of some non-limiting examples, the default language may be the official language of the country in which the user lives, country in which the user is currently located, a language preferred by the user, etc. Each of the examples 802A, 802*b* and 802C further provides a close button should the user wish to cancel the operation.

In accordance with one or more embodiments, a popup window such as that shown in FIG. 8C may be displayed in proximity to the selection 804, e.g., above, below, alongside, etc. In the example of FIG. 8C, the popup window 820 is displayed above selection 804. The popup menu 820 includes a set of icons 834, each of which represents a user-selectable action. In the example, the leftmost icon in the set 834 represents a translate action and is initially selected when the menu 820 is displayed. Scroll buttons 826 provide a mechanism for scrolling through the set of icons 834. A search bar 836 may initially display the content from selection 804, and the user may modify the selection via the search bar 836, e.g., modify the word(s) being translated. Menu 820 may further include an area 838 for displaying other content, such as one or more advertisements, a scroll bar 830A which may include scroll buttons, display areas 826 and 828 and pull-down menus 822 and 824. Pull-down menus 822 and 824 allow the user to change the from and to languages, respectively, and display areas 826 and 828 display the selection 804 in the corresponding languages.

Figure 9:
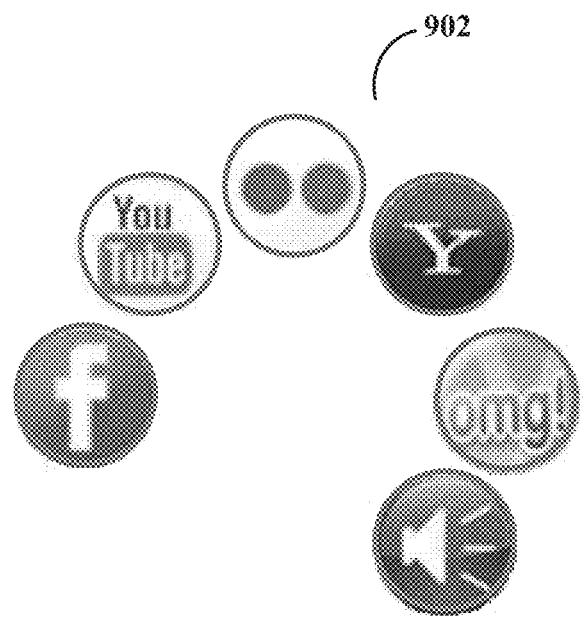
Figure 10:
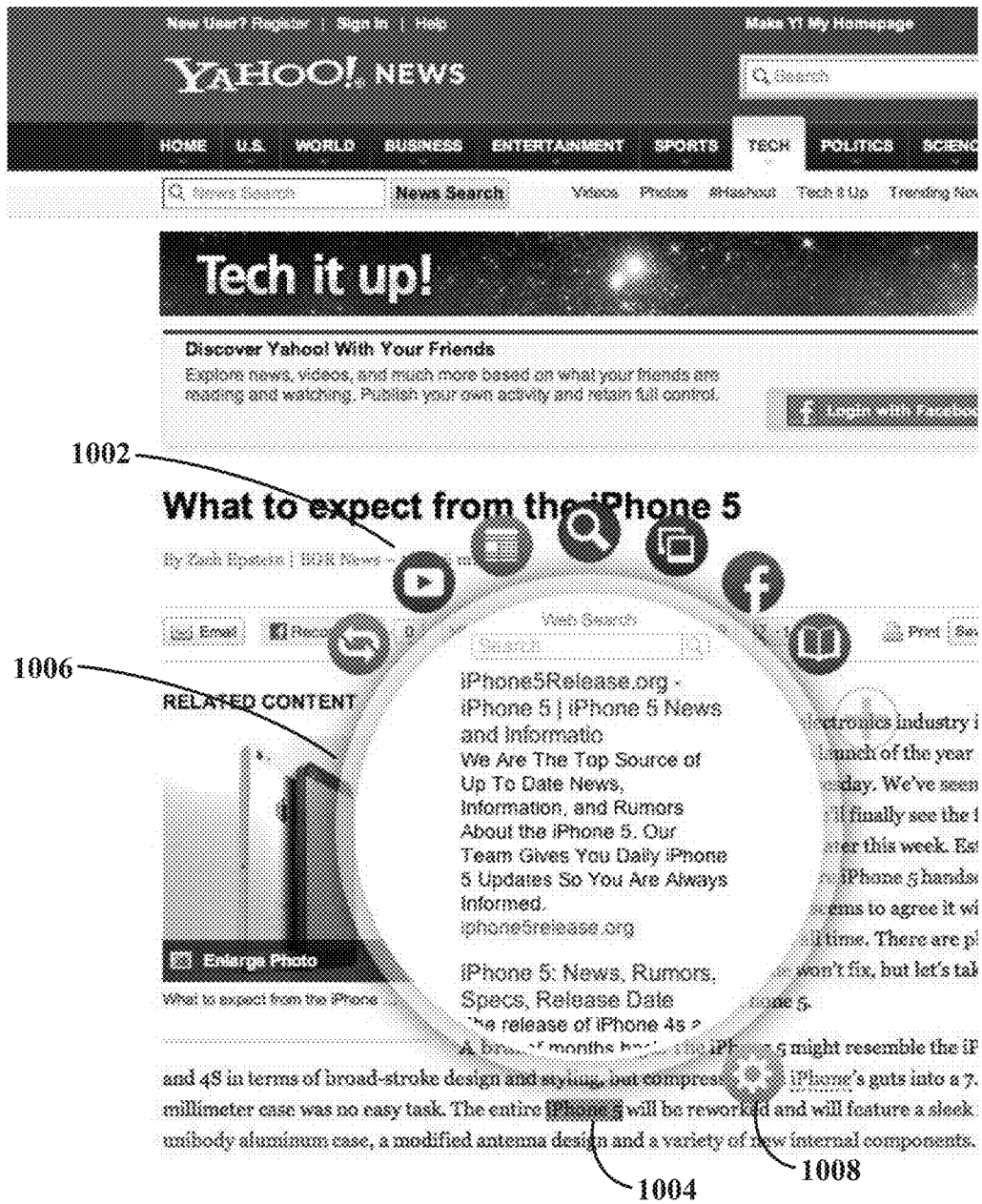
Figure 11:

The examples provided herein display a set of icons in a horizontal or vertical fashion. It should be apparent that other alternatives may be used in accordance with one or more embodiments of the present disclosure. FIGS. 9, 10 and 11 provide examples of a set of icons displayed in a radial, or circular, manner in accordance with one or more embodiments. In accordance with one or more embodiments, a determination may be made whether or not to display the set of icons based on one or more contexts, e.g., context of the content, context of the device and or context of the user. Additionally, one or more of the icons in the set may be determined based on one or more contexts.

In the example shown in FIG. 9, the set of icons 902 may be displayed radially within the boundaries of the page containing the content selection, such as without limitation superimposed on the page and positioned above the content selection. FIG. 10 provides another example of a set of icons 1002 provided radially as part of a menu, which includes search results being displayed within a circle 1006 of the menu. The menu includes a configuration icon 1008, which may include options such as without limitation a personalization options, or options. The menu may be displayed in response to selection 1004 by the user. FIG. 11 provides another example of a set of icons 1102 displayed radially with search results being displayed within the radial display.

Figure 12:
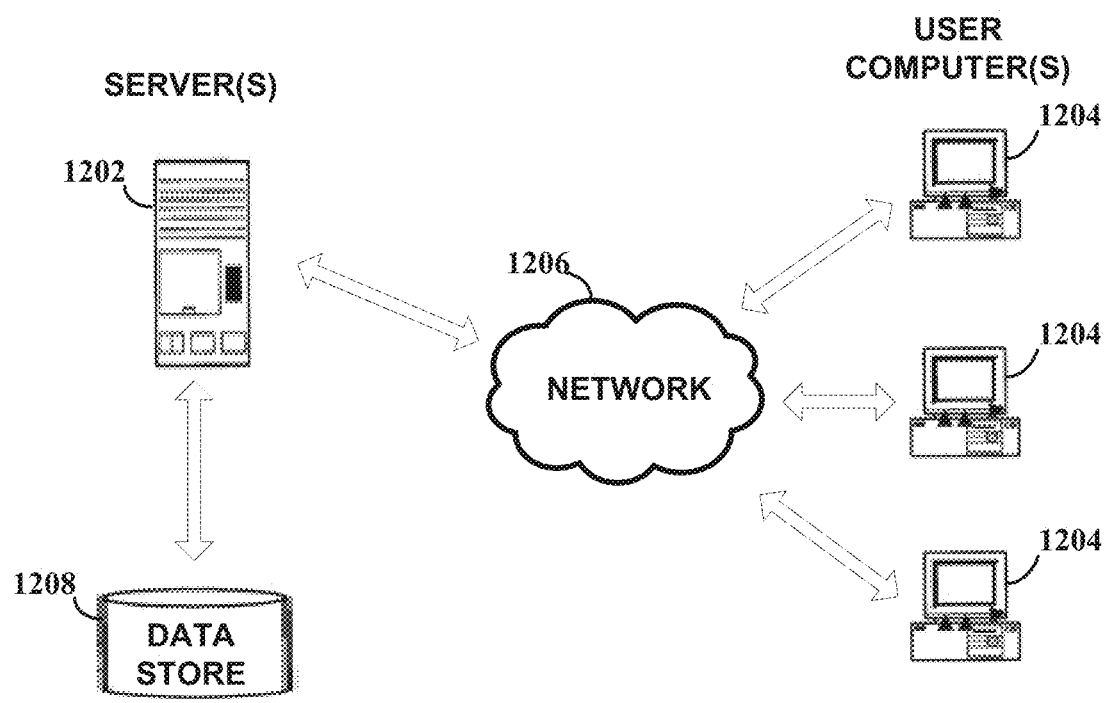
FIG. 12 illustrates some components that can be used in connection with one or more embodiments of the present disclosure.

FIG. 12 illustrates some components that can be used in connection with one or more embodiments of the present disclosure. In accordance with one or more embodiments of the present disclosure, one or more computing devices, e.g., one or more servers, user devices or other computing device, are configured to comprise functionality described herein. For example, a computing device 1202 can be configured to execute program code, instructions, etc. to provide functionality in accordance with one or more embodiments of the present disclosure. The same or another computing device 1202 can be associated with one or more data store 1208.

In accordance with one or more embodiments, at least some portion of process flow of FIG. 1 may be implemented by server computer 1202, user computing device 1204 or a combination of server computer 1202 and user computing device 1204. In accordance with one or more such embodiments, computing device 1202 and/or 1204 may execute program code to implement the process flow of FIG. 1.

Computing device 1202 can serve content to user computing devices 1204 using a browser application via a network 1206. Data store 1208 can be used to store program data for use with program code that configures a server 1202 to execute at least some portion of the process flow of FIG. 1, etc.

The user computing device 1204 can be any computing device, including without limitation a personal computer, personal digital assistant (ppm, wireless device, cell phone, internet appliance, media player, home theater system, and media center, or the like. For the purposes of this disclosure a computing device includes a processor and memory for storing and executing program code, data and software, and may be provided with an operating system that allows the execution of software applications in order to manipulate data. In accordance with one or more embodiments, computing device 1204 may implement program code to implement at least some portion of the process flow of FIG. 1. A computing device such as server 1202 and the user computing device 1204 can include one or more processors, memory, a removable media reader, network interface, display and interface, and one or more input devices, e.g., keyboard, keypad, mouse, etc. and input device interface, for example. One skilled in the art will recognize that server 1202 and user computing device 1204 may be configured in many different ways and implemented using many different combinations of hardware, software, or firmware.

In accordance with one or more embodiments, a computing device 1202 can make a user interface available to a user computing device 1204 via the network 1206. The user interface made available to the user computing device 1204 can include content items, or identifiers (e.g., URLs) selected for the user interface in accordance with one or more embodiments of the present invention. In accordance with one or more embodiments, computing device 1202 makes a user interface available to a user computing device 1204 by communicating a definition of the user interface to the user computing device 1204 via the network 1206. The user interface definition can be specified using any of a number of languages, including without limitation a markup language such as Hypertext Markup Language, scripts, applets and the like. The user interface definition can be processed by an application executing on the user computing device 1204, such as a browser application, to output the user interface on a display coupled, e.g., a display directly or indirectly connected, to the user computing device 1204.

In an embodiment the network 1206 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

As discussed, a network may couple devices so that communications may be exchanged, such as between a server computing device and a client computing device or other types of devices, including between wireless devices coupled via a wireless network, for example. A network may also include mass storage, such as network attached storage (NAS), storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example. For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/gln, or the like. A wireless network may include virtually any type of wireless communication mechanism by which signals may be communicated between devices, such as a client device or a computing device, between or within a network, or the like.

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

It should be apparent that embodiments of the present disclosure can be implemented in a client-server environment such as that shown in FIG. 12. Alternatively, embodiments of the present disclosure can be implemented with other environments. As one non-limiting example, a peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Figure 13:
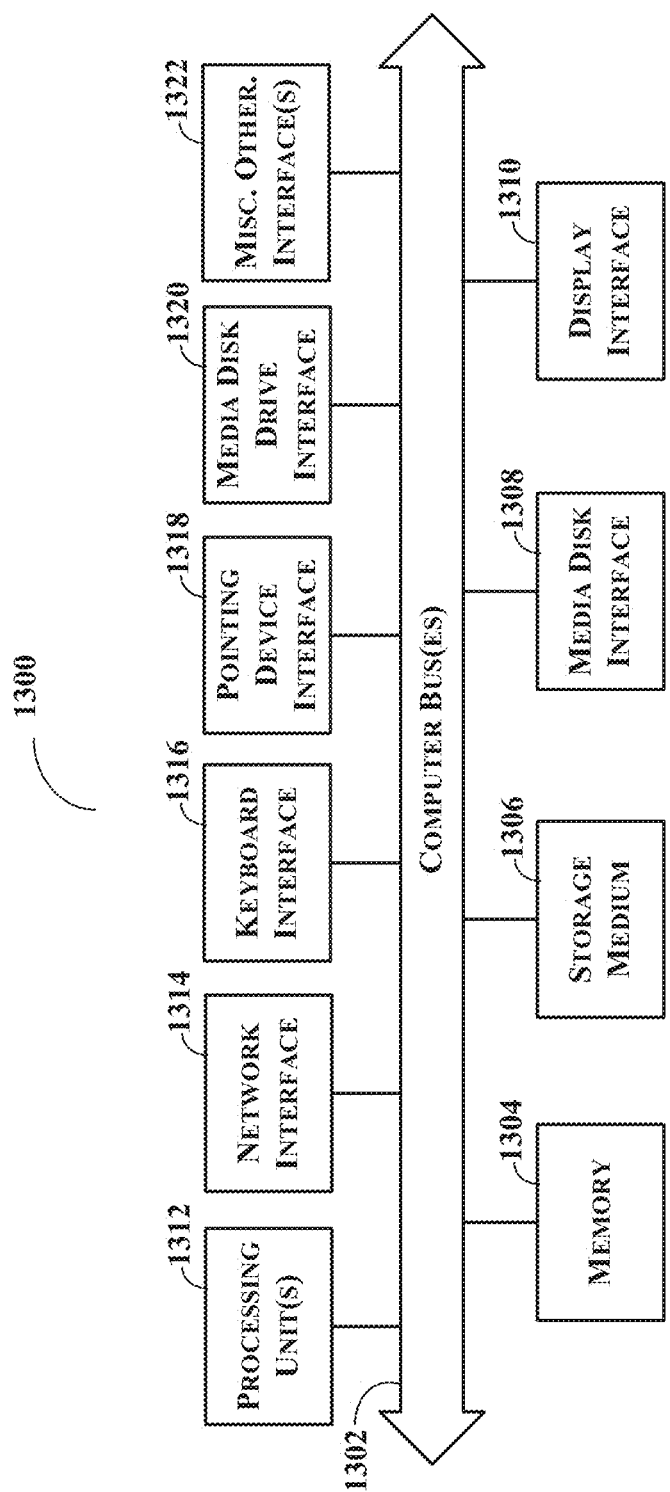
FIG. 13 is a detailed block diagram illustrating an internal architecture of a computing device in accordance with one or more embodiments of the present disclosure.

FIG. 13 is a detailed block diagram illustrating an internal architecture of a computing device, e.g., a computing device such as server 1202 or user computing device 1204, in accordance with one or more embodiments of the present disclosure. As shown in FIG. 13, internal architecture 1300 includes one or more processing units, processors, or processing cores, (also referred to herein as CPUs) 1312, which interface with at least one computer bus 1302. Also interfacing with computer bus 1302 are computer-readable medium, or media, 1306, network interface 1314, memory 1304, e.g., random access memory (RAM), nm-time transient memory, read only memory (ROM), etc., media disk drive interface 1320 as an interface for a drive that can read and/or write to media including removable media such as floppy, CD-ROM, DVD, etc. media, display interface 1310 as interface for a monitor or other display device, keyboard interface 1316 as interface for a keyboard, pointing device interface 1318 as an interface for a mouse or other pointing device, and miscellaneous other interfaces not shown individually, such as parallel and serial port interfaces, a universal serial bus (USB) interface, and the like.

Memory 1304 interfaces with computer bus 1302 so as to provide information stored in memory 1304 to CPU 1312 during execution of software programs such as an operating system, application programs, device drivers, and software modules that comprise program code, and/or computer-executable process steps, incorporating functionality described herein, e.g., one or more of process flows described herein. CPU 1312 first loads computer-executable process steps from storage, e.g., memory 1304, computer-readable storage medium/media 1306, removable media drive, and/or other storage device. CPU 1312 can then execute the stored process steps in order to execute the loaded computer-executable process steps. Stored data, e.g., data stored by a storage device, can be accessed by CPU 1312 during the execution of computer-executable process steps.

Persistent storage, e.g., medium/media 1306, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:
    determining, via at least one processing unit, a context of content being output by a device of a user;
    determining, via the at least one processing unit, a device context identifying a geographic location of the device;
    determining, via the at least one processing unit, a user context comprising information about the user's interaction with menu options previously provided to the user, the determining comprising gathering user input indicating the user's previous interaction with menu options;
    detecting, via the at least one processing unit, user interaction by the user with the device, the current user interaction comprising interaction with selected content output by the device;
    determining, via the at least one processing unit, a number of options using the context of the content, the device context and the user context;
    making a determination, via the at least one processing unit, that none of the number of options has a threshold likelihood of being an option sought by the user, the determination being made using the context of the content, the device context and the user context;
    in response to the determination that none of the number of options has a threshold likelihood of being an option sought by the user, selecting, via the at least one processing unit, a first reply of displaying a menu comprising the number of determined options selectable by the user, the first reply being selected rather than selecting a second reply of displaying a result of a performance of an option sought by the user, the second reply being available for selection in a case that an option sought by the user is determinable; and
    instructing, via the at least one processing unit, the device to output the selected first reply in response to the user interaction.

2. The method of claim 1, the selected content comprising preselected content.

3. The method of claim 2, the preselected content is preselected based on the context of the content being output by the device.

4. The method of claim 2, the preselected content is preselected based on the context of the content being output by the device and the context of the device.

5. The method of claim 2, the selected content is preselected based on the context of the content being output by the device, the context of the device and the context of the user.

6. The method of claim 1, the menu further comprising additional content.

7. The method of claim 6, the additional content comprising an advertisement.

8. The method of claim 1, at least one option of the number of user-selectable options is included in the menu based on user preference.

9. The method of claim 1, the number of user-selectable options comprising at least one non-search option and at least one search option to perform a search using the selected content.

10. The method of claim 9, the context of the content and the context of the device influence the search results returned in response to selection of the search option from the menu.

11. The method of claim 9, the context of the content, the context of the device and the user context influence the search results returned in response to selection of the search option from the menu.

12. The method of claim 1, the number of user-selectable options comprising at least one option selectable to share the selected content via at least one social media network.

13. The method of claim 1, the selected content is selected by the user interaction.

14. A system comprising:
at least one computing device comprising a processor and a non-transitory storage medium for tangibly storing thereon program logic for execution by the processor, the stored program logic comprising:
determining logic executed by the processor for determining a context of content being output by a device of a user;
determining logic executed by the processor for determining a device context identifying a geographic location of the device;
determining logic executed by the processor for determining a user context comprising information about the user's interaction with menu options previously provided to the user, the determining comprising gathering user input indicating the user's previous interaction with menu options;
detecting logic executed by the processor for detecting user interaction by the user with the device, the current user interaction comprising interaction with selected content output by the device;
determining logic executed by the processor for determining a number of options using the context of the content, the device context and the user context;
making logic executed by the processor for making a determination that none of the number of options has a threshold likelihood of being an option sought by the user, the determination being made using the context of the content, the device context and the user context;
in response to the determination that none of the number of options has a threshold likelihood of being an option sought by the user, selecting logic executed by the processor for selecting a first reply of displaying a menu comprising the number of determined options selectable by the user, the first reply being selected rather than selecting a second reply of displaying a result of a performance of an option sought by the user, the second reply being available for selection in a case that an option sought by the user is determinable; and
instructing logic executed by the processor for instructing, via the at least one processing unit, the device to output the selected first reply in response to the user interaction.

15. The system of claim 14, the selected content comprises preselected content.

16. The system of claim 15, the preselected content is preselected based on the context of the content being output by the device.

17. The system of claim 15, the preselected content is preselected based on the context of the content being output by the device and the context of the device.

18. The system of claim 15, the selected content is preselected based on the context of the content being output by the device, the context of the device and the context of the user.

19. The system of claim 14, the menu further comprising additional content.

20. The system of claim 19, the additional content comprising an advertisement.

21. The system of claim 14, at least one option of the number of user-selectable options is included in the menu based on user preference.

22. The system of claim 14, the number of user-selectable options comprising at least one non-search option and at least one search option to perform a search using the selected content.

23. The system of claim 22, the context of the content and the context of the device influence the search results returned in response to selection of the search option from the menu.

24. The system of claim 22, the context of the content, the context of the device and the context of the user influence the search results returned in response to selection of the search option from the menu.

25. The system of claim 14, the number of user-selectable options comprising at least one option selectable to share the selected content via at least one social media network.

26. The system of claim 14, the selected content is selected by the user interaction.

27. A non-transitory computer readable storage medium for tangibly encoded with computer executable instructions that when executed by a processor associated with a computing device perform a method comprising:
determining a context of content being output by a device of a user;
determining a device context identifying a geographic location of the device;
determining a user context comprising information about the user's interaction with menu options previously provided to the user, the determining comprising gathering user input indicating the user's previous interaction with menu options;
detecting user interaction by the user with the device, the current user interaction comprising interaction with selected content output by the device;
determining a number of options using the context of the content, the device context and the user context;
making a determination that none of the number of options has a threshold likelihood of being an option sought by the user, the determination being made using the context of the content, the device context and the user context;
in response to the determination that none of the number of options has a threshold likelihood of being an option sought by the user, selecting a first reply of displaying a menu comprising the number of determined options selectable by the user, the first reply being selected rather than selecting a second reply of displaying a result of a performance of an option sought by the user, the second reply being available for selection in a case that an option sought by the user is determinable; and instructing, via the at least one processing unit, the device to output the selected first reply in response to the user interaction.

28. The medium of claim 27, the selected content comprises preselected content.

29. The medium of claim 28, the preselected content is preselected based on the context of the content being output by the device.

30. The medium of claim 28, the preselected content is preselected based on the context of the content being output by the device and the context of the device.

31. The medium of claim 28, the selected content is preselected based on the context of the content being output by the device, the context of the device and the context of the user.

32. The medium of claim 27, the menu further comprising additional content.

33. The medium of claim 32, the additional content comprising an advertisement.

34. The medium of claim 27, at least one option of the number of user-selectable options is included in the menu based on user preference.

35. The medium of claim 27, the number of user-selectable options comprising at least one non-search option and at least one search option to perform a search using the selected content.

36. The medium of claim 35, the context of the content and the context of the device influence the search results returned in response to selection of the search option from the menu.

37. The medium of claim 35, the context of the content, the context of the device and the context of the user influence the search results returned in response to selection of the search option from the menu.

38. The medium of claim 27, the number of user-selectable options comprising at least one option selectable to share the selected content via at least one social media network.

39. The medium of claim 27, the selected content is selected by the user interaction.

* * * * *